US012528994B2

(12) United States Patent
Matsunaga et al.

(10) Patent No.: US 12,528,994 B2
(45) Date of Patent: Jan. 20, 2026

(54) METHOD FOR DECOMPOSING ORGANIC RAW MATERIAL, AND A METHOD FOR PRODUCING A LIQUID FUEL, A SOLID FUEL, OR ACTIVATED CHARCOAL USING THE SAME

(71) Applicant: REVO INTERNATIONAL INC., Kyoto (JP)

(72) Inventors: Kotetsu Matsunaga, Kyoto (JP); Tetsuya Koshikawa, Kyoto (JP); Yuichiro Azuma, Kyoto (JP); Shoi Koshikawa, Kyoto (JP); Isao Mochida, Kyoto (JP)

(73) Assignee: REVO INTERNATIONAL INC., Kyoto (JP)

( * ) Notice: Subject to any disclaimer, the term of this patent is extended or adjusted under 35 U.S.C. 154(b) by 244 days.

(21) Appl. No.: 18/286,424

(22) PCT Filed: Apr. 12, 2022

(86) PCT No.: PCT/JP2022/017616
§ 371 (c)(1),
(2) Date: Oct. 11, 2023

(87) PCT Pub. No.: WO2022/220246
PCT Pub. Date: Oct. 20, 2022

(65) Prior Publication Data
US 2024/0191141 A1     Jun. 13, 2024

(30) Foreign Application Priority Data

Apr. 14, 2021   (JP) .................. 2021-068497

(51) Int. Cl.
*C10G 7/00*    (2006.01)
*C10G 1/08*    (2006.01)
*C10G 11/18*   (2006.01)

(52) U.S. Cl.
CPC ............... *C10G 1/086* (2013.01); *C10G 7/00* (2013.01); *C10G 2300/1003* (2013.01); *C10G 2300/1014* (2013.01); *C10G 2300/4081* (2013.01)

(58) Field of Classification Search
None
See application file for complete search history.

(56) References Cited

U.S. PATENT DOCUMENTS 3,977,947 A * 8/1976 Pyle .................. C10B 53/02
                                              201/37
5,728,271 A    3/1998 Piskorz et al.
(Continued)

FOREIGN PATENT DOCUMENTS

JP    54-43902      4/1979
JP    55-135195    10/1980
(Continued)

OTHER PUBLICATIONS

Extended European Search Report issued Mar. 27, 2025 in European Patent Application No. 22788169.5.
(Continued)

*Primary Examiner* — Tam M Nguyen
(74) *Attorney, Agent, or Firm* — Wenderoth, Lind & Ponack, L.L.P.

(57) ABSTRACT

A method for decomposing an organic raw material, comprising: a raw material supply step of supplying an organic raw material containing biomass and/or organic polymer waste, and an artificial carbon particle to a fluidized-bed-type decomposition apparatus, and a decomposition step of decomposing the organic raw material into a non-solid decomposition component and a solid residue while fluidizing the artificial carbon particle with introducing a carrier gas to the fluidized-bed-type decomposition apparatus, to discharge the non-solid decomposition component with the (Continued)

carrier gas as well as to discharge the solid residue separately from the non-solid decomposition component.

21 Claims, 2 Drawing Sheets

(56) References Cited

U.S. PATENT DOCUMENTS

| | | | |
|---|---|---|---|
| 5,853,548 | A | 12/1998 | Piskorz et al. |
| 6,534,689 | B1 * | 3/2003 | Stankevitch ............ C10G 1/10 585/241 |
| 9,359,200 | B2 * | 6/2016 | Maass ...................... C01B 3/28 |
| 2009/0253948 | A1 | 10/2009 | McCall et al. |
| 2014/0303414 | A1 | 10/2014 | Mazanec et al. |
| 2019/0153324 | A1 | 5/2019 | Urade et al. |
| 2019/0161683 | A1 | 5/2019 | Narayanaswamy et al. |

FOREIGN PATENT DOCUMENTS

| | | |
|---|---|---|
| JP | 58-37242 | 8/1983 |
| JP | 10-185113 | 7/1998 |
| JP | 2001-65364 | 3/2001 |
| JP | 2004-339360 | 12/2004 |
| JP | 2005-272782 | 10/2005 |
| JP | 2008-189704 | 8/2008 |
| JP | 2009-46644 | 3/2009 |
| JP | 4371433 | 11/2009 |
| JP | 2011-517470 | 6/2011 |
| JP | 2013-170224 | 9/2013 |
| JP | 2016-79325 | 5/2016 |
| JP | 2016-517344 | 6/2016 |
| JP | 2017-80662 | 5/2017 |
| JP | 2018-39989 | 3/2018 |
| WO | 2014/089131 | 6/2014 |

OTHER PUBLICATIONS

Shu-Yii Wu, et al., "The fluidized bed pyrolysis of shredded tyres: the influence of carbon particles, humidity, and temperature on the hydrodynamics", Powder Technology, Oct. 1, 1997, vol. 93, No. 3, pp. 283-290.

International Search Report issued May 24, 2022 in International (PCT) Application No. PCT/JP2022/017616.

European Office Action issued Oct. 21, 2025 in corresponding European Patent Application No. 22788169.5.

* cited by examiner

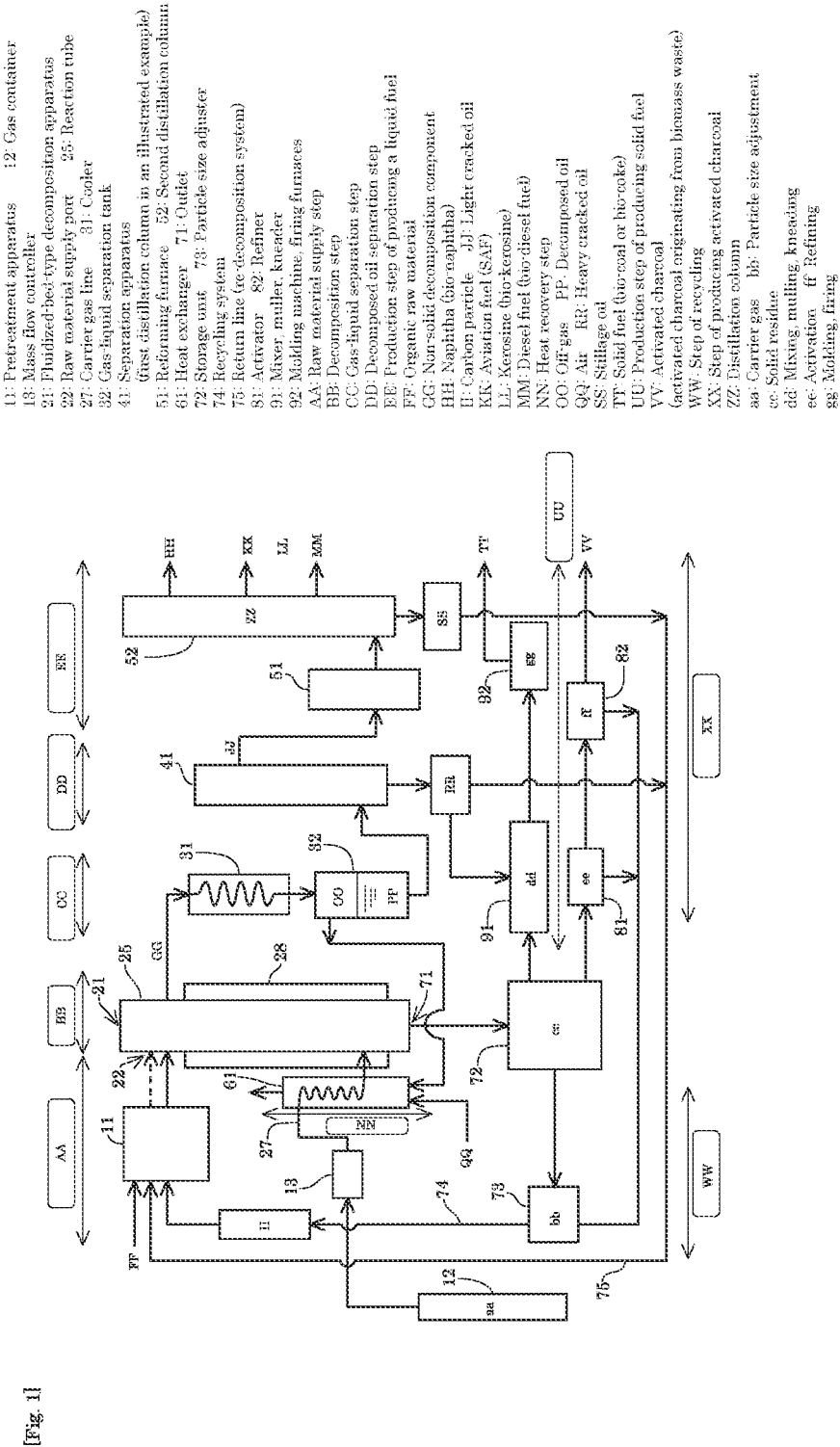
[Fig. 1]

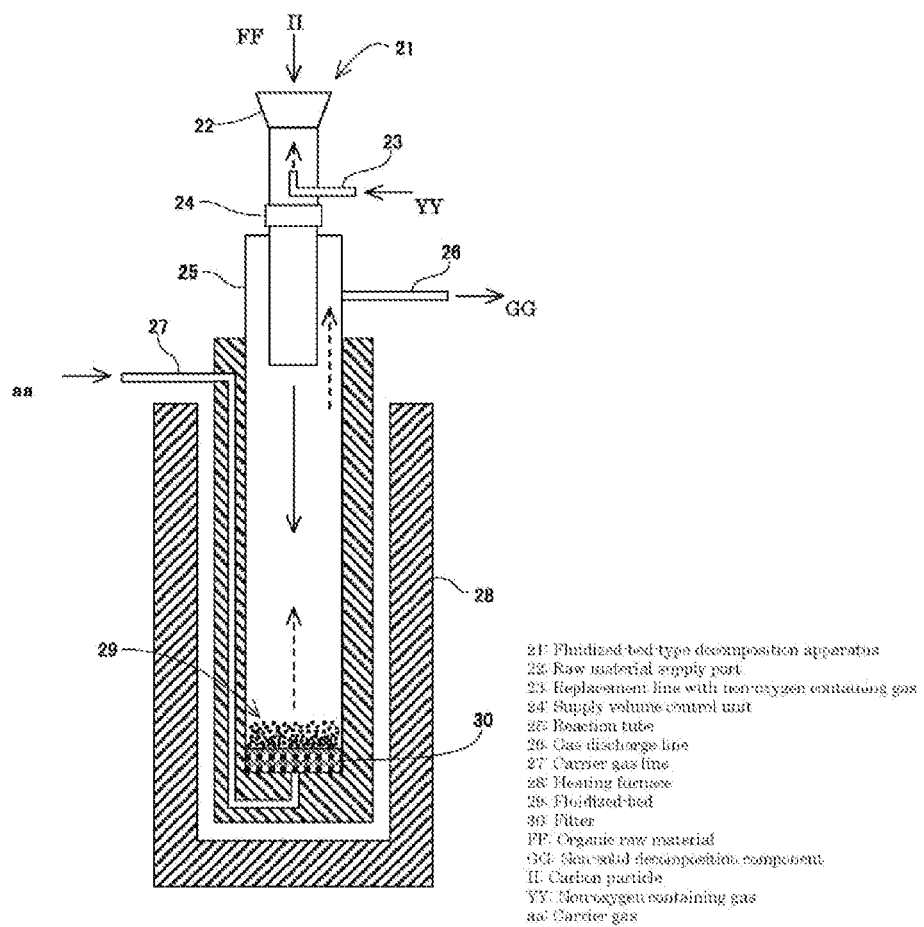

METHOD FOR DECOMPOSING ORGANIC RAW MATERIAL, AND A METHOD FOR PRODUCING A LIQUID FUEL, A SOLID FUEL, OR ACTIVATED CHARCOAL USING THE SAME

TECHNICAL FIELD

The present invention relates to a method for decomposing an organic raw material containing biomass and/or organic polymer waste.

BACKGROUND ART

As a measure against global warming, techniques to reduce the emission of greenhouse gases have been developed, for example, by converting biomass and organic polymer waste into liquid fuels and carbon raw materials.

For example, Patent Document 1 discloses a method for producing methanol, dimethyl ether (DME), and hydrocarbon-based liquid fuels (FT synthetic oils) through catalytic reaction of the carbon monoxide and hydrogen that are generated by gasification of biomass by heating it at a temperature ranging from 600 to 1000° C. and a pressure ranging from 1 to 5 MPa. Patent Document 2 discloses that the gasification gas of methane, hydrogen, or carbon monoxide or liquefied gas, which is generated by reacting biomass with pressurized hot water, supercritical water, or subcritical water under the presence of sodium hydroxide and a catalyst at a temperature ranging from 200 to 500° C. and a pressure ranging from 100 to 400 atm, are used as a fuel for power generation systems such as gas turbines and diesel generators. However, the methods disclosed in Patent Documents 1 and 2 mainly aim to decompose biomass into $C_1$ components, such as methane and carbon monoxide, or a liquefied gas, therefore, those methods are not suitable as methods for producing liquid fuels. In addition, those methods are disadvantageous in that they need high-temperature and high-pressure conditions.

Patent Document 3 discloses a method for producing petroleum alternative liquid fuels through thermal co-pyrolysis of plastic and woody biomass under pressure and under the presence of a mineral oil as a solvent, and a catalyst (NaY-type zeolite), if needed, in an autoclave. Patent Document 4 discloses a method for producing bio-oil by liquefaction and thermal decomposition of mixed raw material of biomass and waste plastic under the presence of a solvent such as ethylene glycol in an autoclave. According to those methods, liquid fuels and bio-oil can be produced without co-pyrolysis of biomass and plastic into $C_1$ components. However, in those methods, solvent contamination of decomposed products occurs. Accordingly, separation of the solvent is required when useful components such as liquid fuels and bio-oil are recovered from the decomposition product, making the production process more complicated. In addition, those methods are disadvantageous in that they need high-temperature and high-pressure conditions.

Patent Document 5 discloses a method for producing $C_{2-5}$ olefins, furans, and aromatic compounds through thermally decomposing biomass in a fluidized bed reactor under the presence of a catalyst containing zeolite. Patent Document 6 discloses a method for producing bio-oil through rapid pyrolysis of lignocellulosic biomass and thermoplastic at ambient pressure in an inert gas stream.

Patent Document 7 discloses a method involving the production of a fuel gas from biomass under the presence of activated charcoal, though it is not a method for producing a liquid fuel but a fuel gas.

CITATION LIST

Patent Literature

Patent Document 1: JP-A-2008-189704
Patent Document 2: JP-A-2001-065364
Patent Document 3: JP-A-2013-170224
Patent Document 4: JP-A-2016-079325
Patent Document 5: JP-A-2016-517344
Patent Document 6: JP-A-2017-080662
Patent Document 7: JP-A-2009-046644

SUMMARY OF THE INVENTION

Problems to be Solved by the Invention

However, according to the study of the present inventors, the methods described in Patent Documents 5 and 6 have room for improvement. Namely, the presence of a catalyst containing zeolite as shown in Patent Document 5 is not essential for an increase in production efficiency of a liquid fuel. In addition, the production efficiency of bio-oil can be higher than the case where method disclosed in Patent Document 6 is employed. Also, the method disclosed in Patent Document 7 is not a method for producing a liquid fuel. Further, even in the production of a liquid fuel, it has turned out that a substance obtained through activation treatment, for example, activated charcoal, was unnecessary for the efficient production of a liquid fuel.

Accordingly, it is an object of the present invention to provide a method for producing useful components such as liquid fuel with high yield from an organic raw material without a catalyst containing zeolite, and even without a substance such as activated charcoal which is produced through complicated production step.

Solution to the Problems

The present invention that solved above problems has the following features.

[1] A method for decomposing an organic raw material, comprising:
  a raw material supply step of supplying an organic raw material containing biomass and/or organic polymer waste, and an artificial carbon particle other than activated charcoal to a fluidized-bed-type decomposition apparatus, and
  a decomposition step of decomposing the organic raw material into a non-solid decomposition component and a solid residue while fluidizing the artificial carbon particle with introducing a carrier gas to the fluidized-bed-type decomposition apparatus, to discharge the non-solid decomposition component with the carrier gas as well as to discharge the solid residue separately from the non-solid decomposition component.

[2] The method according to [1], wherein the method comprises a step of recycling by returning at least a part of the solid residue discharged from the decomposition step to the raw material supply step as the artificial carbon particle before the solid residue is cooled to room temperature.

[3] The method according to [1] or [2], wherein the method comprises a step of returning at least a part of the solid residue discharged from the decomposition step to the raw material supply step as the artificial carbon particle with or without particle size adjustment.

[4] The method according to any one of [1] to [3], wherein the artificial carbon particle has a specific surface area of 500 m²/g or less.

[5] The method according to any one of [1] to [4], wherein the artificial carbon particle contains a metal atom in an amount of 20% by mass or less.

[6] The method according to any one of [1] to [15], wherein, in the raw material supply step, the organic raw material is subjected to at least one type of pretreatment selected from impurities removal, moisture removal, particle size adjustment, and raw material blending, to be supplied to the fluidized-bed-type decomposition apparatus.

[7] The method according to any one of [1] to [6], wherein, in the raw material supply step, at least one selected from the organic raw material, the artificial carbon particle, and a mixture of the organic raw material and the artificial carbon particle is continuously supplied to the fluidized-bed-type decomposition apparatus.

[8] The method according to any one of [1] to [7], wherein the biomass is at least one type selected from lignocellulosic biomass and biomass of fat derived from an oil plant, and the organic polymer waste is at least one type of waste selected from synthetic resin, synthetic rubber, and synthetic fiber.

[9] The method according to any one of [1] to [8], wherein, in the raw material supply step, the organic raw material and the artificial carbon particle are supplied together with organic acids to the fluidized-bed-type decomposition apparatus.

[10] The method according to [9], wherein the organic acids are mixed with the organic raw material and the artificial carbon particle, to be supplied to the fluidized-bed-type decomposition apparatus.

[11] The method according to [9] or [10], wherein the organic acids include a fatty acid derived from fat and oil or a salt of the fatty acid.

[12] The method according any one of [1] to [11], wherein the carrier gas is nitrogen containing oxygen at a concentration of 3% by volume or less.

[13] The method according to any one of [1] to [12], wherein the method further comprises:
  a gas-liquid separation step of separating the non-solid decomposition component discharged from the fluidized-bed-type decomposition apparatus into an off-gas component and a decomposed oil by cooling, and
  a heat recovering step of recovering heat generated by combusting the off-gas component through heating the carrier gas before introduction into the fluidized-bed-type decomposition apparatus.

[14] A method for producing a decomposed oil, comprising the steps of the decomposition method according to any one of [1] to [12], wherein the method further comprises:
  a gas-liquid separation step of separating the non-solid decomposition component discharged from the fluidized-bed-type decomposition apparatus into an off-gas component and a decomposed oil by cooling.

[15] A method for producing reformate, comprising the steps of the method for producing the decomposed oil according to [14], wherein the method further comprises:
  a reforming treatment step of conducting at least one type of reforming treatment selected from dehydrogenation, conversion, isomerization, hydrogenation, hydrocracking, and hydrotreating under the presence of a catalyst.

[16] A method for producing a liquid fuel, comprising the steps of the method for producing the reformate according to [15], wherein the method further comprises a step of distilling the reformate.

[17] A method for producing a liquid fuel, comprising the steps of the decomposition method according to any one of [1] to [12], wherein the method further comprises:
  a gas-liquid separation step of separating the non-solid decomposition component discharged from the fluidized-bed-type decomposition apparatus into an off-gas component and a decomposed oil by cooling,
  a decomposed oil separation step of separating the decomposed oil generated in the gas-liquid separation step into a light cracked oil and a heavy cracked oil based on a difference in boiling point and/or a difference in solubility, and
  a production step of producing a liquid fuel by distilling the light cracked oil generated in the decomposed oil separation step.

[18] The production method according to [17], wherein, in the production step of liquid fuel, the light cracked oil before distillation and/or distillate after distillation is subjected to at least one type of reforming treatment selected from dehydrogenation, conversion, isomerization, hydrogenation, hydrocracking, and hydrotreating under the presence of a catalyst.

[19] The production method according to [17] or [18], wherein, in the production step of liquid fuel, at least one type of product selected from naphtha, an aviation fuel, kerosine, and diesel fuel is generated.

[20] The production method according to any one of [17] to [19], wherein the naphtha is bio-naphtha, the aviation fuel is SAF, the kerosine is bio-kerosine, and the diesel fuel is bio-diesel fuel.

[21] The production method according to any one of [17] to [20], wherein at least one selected from the heavy cracked oil generated in the decomposed oil separation step and the remaining oil which has not been distilled off as the liquid fuel from the distillation column in the production step of the liquid fuel is returned to the decomposition step for reprocessing.

[22] A method for producing the solid fuel, comprising the steps of the decomposition method according to any one of [1] to [12], wherein the method further comprises:
  a gas-liquid separation step of separating the non-solid decomposition component discharged from the fluidized-bed-type decomposition apparatus into an off-gas component and a decomposed oil by cooling,
  a decomposed oil separation step of separating the decomposed oil generated in the gas-liquid separation step into a light cracked oil and a heavy cracked oil based on a difference in boiling point and/or a difference in solubility, and
  a production step of producing a solid fuel by subjecting the solid residue discharged from the decomposition step and the heavy cracked oil generated in the decomposed oil separation step to at least one type of treatment selected from mixing, mulling, and kneading, and then molding and/or firing, if needed.

[23] The production method according to [22], wherein the solid fuel is bio-coal or bio-coke.

[24] The production method according to [22] or [23], wherein a part of the heavy cracked oil generated in the decomposed oil separation step is returned to the decomposition step for reprocessing.

[25] A method for producing activated charcoal, comprising the steps of the decomposition method according to any one of [1] to [12], wherein the method further comprises the step of producing activated charcoal by activating the solid residue discharged from the decomposition step, and then refining, if needed.

[26] The method according to [25], wherein the activated charcoal is produced as activated charcoal originating from biomass waste.

[27] A decomposition equipment of an organic raw material, comprising:
- a fluidized-bed-type decomposition apparatus to decompose an organic raw material including biomass and/or organic polymer waste into a non-solid decomposition component and a solid residue with an artificial carbon particle other than activated charcoal fluidized by a carrier gas,
- at least one raw material supply port mounted to the fluidized-bed-type decomposition apparatus to supply the organic raw material and the artificial carbon particle other than activated charcoal,
- a carrier gas line to supply the carrier gas to the fluidized-bed-type decomposition apparatus, and
- a gas discharge line to discharge the non-solid decomposition component together with the carrier gas from the fluidized-bed-type decomposition apparatus.

[28] The decomposition equipment according to [27], wherein the decomposition equipment further comprises:
- an outlet of the solid residue mounted to the fluidized-bed-type decomposition apparatus and,
- a recycling system to return the discharged solid residue to the raw material supply port.

[29] The decomposition equipment according to [27] or [28], wherein the decomposition equipment further comprises a gas-liquid separation tank to separate a decomposed oil and an off gas from the non-solid decomposition component discharged from the fluidized-bed-type decomposition apparatus.

[30] The decomposition equipment according to any one of [27] to [29], wherein the decomposition equipment further comprises a reforming furnace to reform the decomposed oil.

[31] The decomposition equipment according to any one of [27] to [30], wherein the decomposition equipment further comprises a distillation column to separate and collect at least one type of liquid fuel selected from naphtha, an aviation fuel, kerosine, and diesel fuel.

[32] The decomposition equipment according to any one of [27] to [31], wherein the decomposition equipment further comprises:
- a decomposition apparatus to separate the decomposed oil contained in the non-solid decomposition component discharged from the fluidized-bed-type decomposition apparatus into a light cracked oil and a heavy cracked oil based on a difference in boiling point and/or a difference in solubility,
- a distillation column to distill the light cracked oil, and
- a re-decomposition system involving returning at least one selected from the heavy cracked oil generated by the separation apparatus and the remaining oil which has not been distilled off as the liquid fuel from the distillation column to the raw material supply port to be decomposed again.

Throughout the specification, the term 'artificial carbon particle' means artificial carbon particle other than activated charcoal.

Advantageous Effects of the Invention

According to the present invention, useful components including a liquid fuel can be efficiently produced at low cost from an organic raw material without a catalyst containing zeolite, and even without a substance such as activated charcoal which is produced through complicated production step.

BRIEF DESCRIPTION OF THE DRAWINGS

FIG. 1 is a schematic diagram illustrating an exemplary decomposition equipment of the present invention.

FIG. 2 is a schematic cross-sectional view of an exemplary decomposition apparatus for the decomposition equipment shown in FIG. 1.

DESCRIPTION OF EMBODIMENTS

[Raw Material Supply Step]

A method according to the present invention comprises:
- a raw material supply step of supplying an organic raw material containing biomass and/or organic polymer waste, and an artificial carbon particle to a fluidized-bed-type decomposition apparatus, and
- a decomposition step of decomposing the organic raw material into a non-solid decomposition component and a solid residue while fluidizing the artificial carbon particle with introducing a carrier gas to the fluidized-bed-type decomposition apparatus, to discharge the non-solid decomposition component with the carrier gas as well as to discharge the solid residue separately from the non-solid decomposition component.

According to the method of the present invention, the organic raw material can be appropriately decomposed due to the presence of the artificial carbon particle, and the yield of the decomposed oil (separated liquid by distillation) contained in the non-solid decomposition component can be improved. The decomposed oil (separated liquid by distillation) is useful as a raw material to produce a liquid fuel.

Any raw material originating from a plant containing a carbon component is available as the biomass, and the raw material is exemplified by lignocellulosic biomass and biomass of fat derived from oil plant. Lignocellulosic biomass is a solid component containing cellulose, hemicellulose, and lignin, and is exemplified by woody biomass, herbaceous biomass, and resource plant biomass. The woody biomass is made from a raw material originating from conifer and hardwood, and is preferably made from waste wood from thinned, timbers remaining in woodlands, lumber remnants, construction waste, prunings and leaves, and chips from the viewpoint of effective use of resources. The herbaceous biomass is made from raw materials originating from, for example, rice, wheat, silver grass, and reeds, and is preferably made from plants parts that do not contain edible seeds, for example, rice straw, wheat straw, silver grass, and reeds from the viewpoint of effective use of resources. As the resource plant biomass, by-products of, for example, sugarcane, corn, and sorghum (e.g., unutilized parts such as bagasse and stems) are desirable.

The biomass of fat derived from oil plant is exemplified by plants capable of producing fat and oil such as rapeseed oil, cottonseed oil, palm oil, coconut oil, sunflower oil, soybean oil, rice oil, corn oil, oil palm oil, cocos nucifera oil, Jatropha oil, and olive oil. The biomass of fat derived from oil plant may be any one of fat and oil, pomace (for example palm residue such as PKS, EFB, and OPT), a seed containing fat and oil, and plant part other than the seed containing fat and oil. The biomass of fat derived from oil plant may be preferably fat and oil or a seed containing fat and oil from the viewpoint of production efficiency of the decomposed oil, and also may be preferably pomace, plant part other than the seed containing fat and oil, or used cooking oil (UCO) from the viewpoint of efficient use of resources. The fat and oil and the pomace may be hydrolyzed, and may further be neutralized, if needed, to be used as biomass. Fatty acid derived from oil plant and salt thereof are classified into organic acids described below in the present invention.

The biomass may be used alone or in combination of two or more.

The organic polymer waste includes at least one type of synthetic polymer waste selected from synthetic resin, synthetic fiber, and synthetic rubber; at least one type of natural polymer waste selected from natural fiber and natural rubber. The natural polymer waste also includes regenerated polymer waste (e.g., regenerated fibers) and semi-synthetic polymer waste (e.g., semi-synthetic fibers) which are obtained through chemical treatment of natural polymer. The synthetic resin includes thermoplastic (including resin) and thermosetting plastic (including resin). The thermoplastic is exemplified by polyethylene, polypropylene, polystyrene, ABS resin, AS resin, polyacrylonitrile, acrylic resin, polyvinyl chloride, polyamide, polyimide, polyacetal, polycarbonate, polybutylene terephthalate, polyethylene terephthalate, polyarylate, polyphenylene oxide, polyphenylene ether, polyamide-imide, polyether, polyetherimide, and polyetheretherketone. The thermosetting plastic is exemplified by phenolic resin, urea resin, melamine resin, furan resin, phenol furfural resin, unsaturated polyester resin, epoxy resin, and polyurethane resin.

Examples of the synthetic fiber include vinylon fiber (polyvinyl alcohol fiber), nylon fiber, polyester fiber, acrylic fiber, polyethylene fiber, and polypropylene fiber.

Examples of the synthetic rubber include styrene-butadiene rubber, butadiene rubber, acrylonitrile-butadiene rubber, isoprene rubber, butyl rubber (copolymer of isobutylene and isoprene), ethylene-propylene-diene rubber.

The natural fiber includes cotton fiber, hemp fiber, wool fiber, and silk fiber.

The natural rubber may be raw rubber before vulcanization or vulcanized rubber.

Among the organic polymer wastes, thermoplastic waste of polyethylene, polypropylene, or polystyrene is preferable as an organic raw material. The organic polymer wastes contain thermoplastic waste in an amount of preferably 50% by mass or more, and more preferably 70% by mass or more. The organic polymer waste may also contain rubber crumb (such as raw rubber crumb and vulcanized natural rubber crumb) and fiber waste (such as cotton waste).

The organic raw material may contain a raw material other than the biomass and the organic polymer waste. Examples of such organic raw material excluding the biomass and the organic polymer waste include waste oils such as mineral oil, animal oil, lubricating oil, insulating oil, cutting oil, and tar pitch.

The organic raw material contains the biomass and the organic polymer waste totally, for example, in an amount of 50% by mass or more, preferably 70% by mass or more, more preferably 90% by mass or more, and the amount may be 100% by mass. The organic raw material may contain either the biomass or the organic polymer waste, or may contain both. In case where the organic raw material contains both, the amount of the biomass with respect to 1 part by mass of the organic polymer waste is, for example, from 0.01 to 100 parts by mass, preferably 0.1 to 10 parts by mass, and more preferably 0.3 to 3 parts by mass.

In one preferable embodiment, the organic raw material may contain the biomass (in particular, woody biomass, and the like) and the organic polymer waste (in particular, thermoplastic waste, and the like) in combination. The combination of the biomass and the organic polymer waste allows synergistic effect to arise, and thus the production yield of decomposed oil and the percentage of hexane-soluble components in the decomposed oil are improved.

In case where the organic raw material contains two or more of raw materials, they may be mixed with each other to be supplied to the fluidized-bed-type decomposition apparatus, or may be separately supplied to the fluidized-bed-type decomposition apparatus without being mixed. The organic raw material may be mixed with the artificial carbon particle to be supplied to the fluidized-bed-type decomposition apparatus, or may be separately supplied to the fluidized-bed-type decomposition apparatus without being mixed with the artificial carbon particle.

The organic raw material may be in the form of liquid or solid, and preferably a mixture of liquid and solid, or in the form of solid. The organic raw material in the form of solid preferably has an appropriate size or the size smaller than it. For example, 90% by mass or more of the biomass can pass through a sieve with an opening of preferably 10 mm, more preferably 7 mm, and further preferably 5 mm. In addition, 90% by mass or more of the organic polymer waste can pass through a sieve with an opening of preferably 30 mm, more preferably 20 mm, further preferably 10 mm, and particularly preferably 5 mm. The lower limit of the size of the organic raw material is not particularly limited, and 90% by mass or more of the organic raw material is on a sieve with an opening of preferably 0.05 mm, more preferably 0.1 mm, and further preferably 0.2 mm.

The artificial carbon particle is not limited as far as the artificial carbon particle does not contain activated charcoal and is a granular carbonized product. Since the artificial carbon particle is the carbon particle other than activated charcoal, the artificial carbon particle for the present invention can be readily available. Even though the artificial carbon particle is the carbon particle other than activated charcoal, a liquid fuel can be produced efficiently. Ninety percent by mass or more of the artificial carbon particle can pass through a sieve with an opening of preferably 5.0 mm, more preferably 3.0 mm, and further preferably 1.0 mm. Further, 90% by mass or more of the artificial carbon particle is on a sieve with an opening of preferably 0.05 mm, more preferably 0.1 mm, and further preferably 0.2 mm.

The artificial carbon particle has apparent density of, for example, 0.1 g/cm$^3$ or more, preferably 0.2 g/cm$^3$ or more, more preferably 0.3 g/cm$^3$ or more, for example, 0.65 g/cm$^3$ or less, preferably 0.60 g/cm$^3$ or less, more preferably 0.55 g/cm$^3$ or less, and further preferably 0.45 g/cm$^3$ or less.

The apparent density can be determined from the volume of the artificial carbon particle by drying the artificial carbon particle at 120° C. for 2 hours or more, placing 20 g of the dried artificial carbon particle in a measuring cylinder (volume: 200 mL), and tapping the cylinder containing the transferred artificial carbon particle until no decrease in capacity is observed.

The carbonized product is not particularly limited as long as it is free from natural products such as coal. The carbonized product is exemplified by a carbonized product obtained by industrially carbonizing coconut shell, pine, bamboo, walnut shell, apricot shell, sunflower seed husks, Jatropha seed husks, rice husk, sawdust, bark chips, rayon, or acrylonitrile. The carbonized product may be a carbonized product obtained by industrially carbonizing the organic raw material. Particularly, carbide a carbonized product (solid residue) generated in the decomposition step of the present invention is preferable. The solid residue can significantly improve the yield of the decomposed oil (separated liquid by distillation) and reduce the production cost.

The carbonized product is obtained, for example, by heating the carbonized product raw materials at around a temperature from 300 to 900° C., preferably 350 to 600° C., more preferably 400 to 500° C. under inert gas atmosphere such as nitrogen. The solid residue is obtained under the conditions of the decomposition step described later, and the conditions of the decomposition step to obtain the solid residue is preferably the same as the conditions of the decomposition step involving the use of the solid residue as the artificial carbon particle to simplify production steps, however, the conditions may be different with each other. The solid residue discharged from the decomposition step may be used as it is or may be used after pretreatment described later.

The specific surface area of the artificial carbon particle can be measured by BET adsorption method with nitrogen gas. The artificial carbon particle has a specific surface area of, for example, 400 $m^2/g$ or less, preferably 300 $m^2/g$ or less, and more preferably 200 $m^2/g$ or less.

The artificial carbon particle other than activated charcoal may be used in combination with activated charcoal as far as the effects of the present invention can be achieved. The activated charcoal includes activated solid residue. The amount of the activated charcoal with respect to 100 parts by mass of the artificial carbon particle is around, for example, from 0 to 100 parts by mass, preferably 0 to 50 parts by mass, more preferably 0 to 10 parts by mass, and particularly preferably 0 parts by mass.

The artificial carbon particle preferably contains less amount of metal component. The artificial carbon particle containing less amount of metal component can prevent metal accumulation in the step of recycling the solid residue described later. The amount of the metal component (metal atom) in the artificial carbon particle is, for example, 20% by mass or less, preferably 15% by mass or less, more preferably 10% by mass or less, and particularly preferably 5% by mass or less. The artificial carbon particle may or may not contain a metal atom as long as the artificial carbon particle contains a metal atom at a percentage within the range described above. The metal atom may contain semimetals such as boron, silicon, arsenic, and tellurium. The artificial carbon particle may contain silicon, for example, in the form of silica, and in such a case, the amount of silicon atom is preferably controlled to the above range or lower.

The artificial carbon particle may positively contain a metal component. The metal component in the artificial carbon particle enables the following effects, such as improvement in decomposition (liquefication) reaction rate of the organic raw material, light oil selection rate, and efficiency in removal of hetero atoms (in particular, removal of oxygen atoms). Examples of the metal components that the artificial carbon particle can positively contain include solid bases such as alkaline earth metal oxides including calcium oxide and magnesium oxide, Japanese acid clay, and solid acids such as silica-alumina and silica-magnesia. In case where the artificial carbon particle contains the solid base such as alkaline earth metal oxides, the amount of it with respect to 100 parts by mass of the artificial carbon particle is, for example, 0.1 to 10 parts by mass, preferably 0.1 to 5 parts by mass, and more preferably 0.5 to 3 parts by mass.

The artificial carbon particle may contain hydrogen, nitrogen, oxygen, sulfur, and chlorine other than carbon.

The organic raw material and the artificial carbon particle may be subjected to pretreatment, if needed, and then supplied to the fluidized-bed-type decomposition apparatus. The pretreatment includes, for example, impurities removal, moisture removal, particle size adjustment, tar removal treatment, and raw material blending. The particle size adjustment includes grinding, granulation, and classification.

The tar removal treatment is conducted when tar is adhered to the artificial carbon particle, and the treatment may be conducted, for example, when the solid residue is used as the artificial carbon particle. Specifically, the tar removal treatment means heat treating the artificial carbon particle (such as solid residue) at a temperature from around 450 to 900° C., preferably around 500 to 700° C. for a short period of time (for example, 5 hours or less, preferably 3 hours or less) under inert gas atmosphere such as nitrogen, and the heat treatment can remove tar. The tar removal treatment enables accurate yield determination of the decomposed oil (separated liquid by distillation).

Blending of raw materials may include a combination of at least two types of different organic raw materials such as biomass and organic polymer waste, a combination of at least two types of different artificial carbon particles, and a combination of the organic raw material and the artificial carbon particle, respectively. Also, in blending of raw materials, known techniques such as mixing, mulling, kneading, and granulating can be employed, and mixing is more preferable among them.

At least a part of the artificial carbon particles is preferably supplied (or all of the artificial carbon particles) to the fluidized-bed-type decomposition apparatus first, separately from the organic raw material, to form the fluidized-bed.

The removal of moisture is preferably conducted by drying. When drying is conducted for moisture removal, any method may be employed. For example, natural drying or drying with process waste heat (for example, waste heat generated by combusting off-gas) is preferable from the viewpoint of energy conservation. The desired moisture content is, for example, 15% by mass or less, more preferably 10% by mass or less, and further preferably 8% by mass or less.

The method for grinding is not particularly limited, and conventional crude crushing and grinding machines such as a cutter mill, vibration mill, and hammer mill can be used. The organic raw material or the artificial carbon particle may be frozen and grinded, if needed.

Before the organic raw material and the artificial carbon particle are supplied to the fluidized-bed-type decomposition apparatus, the atmospheric gas surrounding the organic raw material and/or the artificial carbon particle is preferably replaced with non-oxygen containing gas. The atmosphere of non-oxygen containing gas can prevent degradation in quality of the organic raw material and the artificial carbon particle when they are supplied to the fluidized-bed-type decomposition apparatus. Examples of the non-oxygen containing gas include inert gases such as argon, helium, and nitrogen, reducing gases such as hydrogen, carbon monoxide, and hydrocarbon gas, ammonia gas, and off-gas. Since oxidizing gas other than oxygen such as water vapor, carbon dioxide, and combustion gas (combustion gas for off-gas) are substantially classified as non-reactive gases in the decomposition step of the present invention, therefore, these gases are included in the non-oxygen containing gases. However, the non-oxygen containing gas is preferably free from oxidizing gases such as water vapor, carbon dioxide, and combustion gas. The non-oxygen containing gas is preferably inert gas or off-gas, and more preferably nitrogen. These non-oxygen containing gases may be used alone or in combination of two or more. The non-oxygen containing gas may contain oxygen as an impurity. The oxygen concentration is, for example, 3% by volume or less, preferably 2% by volume or less, and more preferably 1% by volume or less. The oxidizing gas concentration in the non-oxygen containing gas is, for example, 10% by volume or less, preferably 5% by volume or less, more preferably 3% by volume or less, and most preferably 0% by volume or less.

[Decomposition Step]

In the decomposition step, the organic raw material is decomposed into a non-solid decomposition component and a solid residue while fluidizing the artificial carbon particle with introducing a carrier gas to the fluidized-bed-type decomposition apparatus at a lower portion (preferably a bottom portion) of the fluidized-bed-type decomposition apparatus, to discharge the non-solid decomposition component with the carrier gas as well as to discharge the solid residue separately from the non-solid decomposition component. In the decomposition step, the organic raw material is decomposed by thermal decomposition, catalytic cracking, or catalytic decomposition, depending on the type of artificial carbon particle.

The fluidized-bed preferably contains the artificial carbon particle, or may be formed from the mixture of the artificial carbon particle and the organic raw material. Once the decomposition reaction is started, the solid residue also becomes a component to form the fluidized-bed. The carrier gas for the formation of the fluidized-bed is preferably non-oxygen containing gas. The non-oxygen containing gas is exemplified by the non-oxygen containing gas shown as the atmospheric gas for the organic raw material and the artificial carbon particle, and has similar preferred range to it.

The fluidized-bed may be formed before the start of the decomposition reaction or may be formed during the decomposition reaction, and the fluidized-bed is preferably formed before the decomposition reaction. In case where the fluidized-bed is formed before the decomposition reaction, the amount of raw material (such as artificial carbon particle and organic raw material) to form the fluidized-bed is, for example, from 10 to 1000 parts by mass, preferably 50 to 500 parts by mass, and more preferably 100 to 300 parts by mass with respect to 1 part by mass of supply amount per minute of the raw material (such as organic raw material and artificial carbon particle) that will be supplied to the fluidized-bed-type decomposition apparatus after the formation of the fluidized-bed.

The flow rate of the carrier gas is, for example, from 0.05 to 30 m$^3$ in the volume of the standard state (the same applies hereafter, unless otherwise specified), preferably 0.1 to 20 m$^3$, and more preferably 0.15 to 10 m$^3$ with respect to 1 kg of the supply volume per minute of the raw materials (organic raw material, artificial carbon particle) that will be supplied to the fluidized-bed-type decomposition apparatus after the formation of the fluidized-bed.

In the decomposition step, the organic raw material is supplied into the decomposition apparatus. The artificial carbon particle may be supplied together with the organic raw material, may be supplied as a raw material to form an initial fluidized-bed before the start of the decomposition reaction, or may be supplied in both of those ways. During the decomposition reaction, the organic raw material and the mixture of the organic raw material and the artificial carbon particle are preferably supplied into the decomposition apparatus continuously, and the artificial carbon particle may also be supplied continuously, if needed. The organic raw material supplied into the decomposition apparatus is then decomposed into the non-solid decomposition component (preferably by thermal decomposition, further more preferably by catalytic cracking) under the presence of the artificial carbon particle (preferably through catalysis by the artificial carbon particle), and a part of the non-solid decomposition component remains as a solid residue in the decomposition apparatus. The non-solid decomposition component is a component in the form of gas or liquid (preferably a component in the form of gas) in the decomposition apparatus and contains the constituents that are difficult to be liquefied, such as carbon dioxide, carbon monoxide, hydrogen, and $C_{1-4}$ hydrocarbons (for example, gaseous constituent at 25° C.) (such a constituent is referred to as off-gas components in this specification, and carbon monoxide, hydrogen, and $C_{1-4}$ hydrocarbons may also be referred to as fuel gases), and also constituents that can be liquefied more easily than the off-gas component (for example, liquid constituents at 25° C.) (hereinafter, referred to as decomposed oil component). The non-solid decomposition component is discharged with the carrier gas from the gas discharge line.

In the decomposition step, the supply rate of the organic raw material and the mixture of the organic raw material and the artificial carbon particle into the decomposition apparatus is, for example, from 0.01 to 10 kg/min, preferably 0.03 to 1 kg/min, and further more preferably 0.05 to 0.5 kg/min per 1 m$^2$ of the cross-sectional area of decomposition reactor of the decomposition apparatus.

The temperature inside the decomposition apparatus is, for example, from 300 to 700° C., preferably 350 to 650° C., and more preferably 400 to 600° C. The temperature inside the decomposition apparatus can be set to, for example, within ±200° C., preferably ±100° C., more preferably ±50° C., and most preferably ±20° C. from the production temperature of the artificial carbon particle.

In the decomposition step, organic acids may be added to the organic raw material and the artificial carbon particle, to be supplied to the fluidized-bed-type decomposition apparatus. The organic acids enable more appropriate decomposition of the organic raw material. The organic acids may be supplied to the apparatus separately from the organic raw material and the artificial carbon particle, alternatively, or may be mixed with the organic raw material and/or the artificial carbon particle, and the organic acids are preferably mixed with the organic raw material to be supplied to the apparatus.

Examples of the organic acids include organic carboxylic acid, organic sulfonic acid, and organic phosphoric acid, and organic carboxylic acid is preferable. The organic carboxylic acid is preferably fatty acid, and exemplified by saturated fatty acids with around 6 to 30 carbons such as caproic acid, caprylic acid, capric acid, lauric acid, myristic acid, stearic acid, arachidic acid, behenic acid, and lignoceric acid, monounsaturated fatty acids with around 10 to 30 carbons such as palmitoleic acid, oleic acid, elaidic acid, vaccenic acid, and erucic acid, and polyunsaturated fatty acids with around 15 to 30 carbons such as linoleic acid, linolenic acid, arachidonic acid, eicosapentaenoic acid, and docosahexaenoic acid. The organic acids preferably include fatty acids derived from fats and oils, and more preferably fatty acids derived from vegetable fats and oils. The fatty acids derived from vegetable fats and oils are a part of biomass, and the use of such fatty acids enables a process to give less environmental load.

The organic acids may comprise salt by neutralization, and the fatty acids derived from fats and oils may be in the form of salt by neutralization.

Fats and oils form fatty acids easily in the decomposition step (thermal decomposition and/or catalytic cracking), thereby functioning similarly as the organic acids.

The amount of the organic acids is, for example, from 0.01 to 30 parts by mass, preferably 0.1 to 20 parts by mass, and more preferably 1 to 10 parts by mass with respect to 100 parts by mass of the organic raw material (excluding fatty acid derived from vegetable fat and oil).

In the decomposition step, a mixed gas of oxygen (alternatively, oxygen-containing gas such as air) and the carrier gas may be flown from the lower portion of the decomposition apparatus (preferably bottom portion) in combination with or instead of the carrier gas. The carrier gas is exemplified by the carrier gas for forming the fluidized-bed, and has the same preferred range to it. Among the artificial carbon particles supplied to the decomposition apparatus, relatively large sized particles or coarsened particles by surface precipitation of carbonaceous material generated in the decomposition reaction will lose fluidity and thus descend, leading to the formation of fixed-bed at the bottom of the fluidized-bed. The flow of the mixed gas of oxygen and the carrier gas may enable partial combustion of the fixed-bed, allowing the heat generated by the combustion to be used as a heat source for the decomposition reaction, i.e., endothermic reaction, of the organic raw material. The concentration of oxygen contained in the mixed gas can be appropriately set within a range not exceeding a safety tolerance value (for example, explosion limit), and the concentration is, for example, from 0.1 to 3% by volume when the mixed gas of oxygen and the carrier gas is supplied to form the fluidized-bed. In this case, oxygen in the mixed gas is preferably consumed by 95% by volume or more through partial combustion of the residue at the fixed bed. When the carrier gas alone is supplied to form the fluidized-bed, the oxygen concentration is less than 0.1% by volume, preferably less than 0.01% by volume, and more preferably the gas is substantially free from oxygen.

[Recycling Step][Production Step of Activated Charcoal]

The solid residue generated in the decomposition step is discharged from the decomposition apparatus separately from the non-solid decomposition component. The discharged solid residue may be stored in the storage unit for the solid residue once, if needed. At least a part of the solid residue is preferably returned to the raw material supply step (recycling step) as the artificial carbon particle before the solid residue is cooled to room temperature (preferably at a temperature of 50° C. or higher). Returning of the solid residue having heat to the raw material supply step enables efficient use of heat. The solid residue may be subjected to particle size adjustment (grinding, granulation, or classification, preferably classification), if needed, before returned to the raw material supply step.

The solid residue may be activated, and further refined, if needed, to be made into activated charcoal (preferably activated charcoal prepared from biomass waste) in the production step of activated charcoal. The activated charcoal made from the solid residue may be returned to the raw material supply step together with the artificial carbon particle.

[Gas-Liquid Separation Step]

The non-solid decomposition component discharged with the carrier gas in the decomposition step is separated into an off-gas component and a liquid component (may be referred to as decomposed oil) by cooling in the step of gas-liquid separation step. In the cooling step, cooling may be divided into multiple steps to collect liquid components (decomposed oil) separated based on differences in boiling points from each step. The separation and collection of liquid components can reduce the load of the decomposed oil separation step described later or enables the omission of the decomposed oil separation step itself. Cooling may not necessarily be divided into multiple steps, or cooling may be divided into multiple steps and then liquid components (decomposed oil) generated from each step may be combined to one solution.

Water may or may not be separated from the decomposed oil. In case where water is not separated from the decomposed oil, the yield of the decomposed oil is, for example, from 53 to 95% by mass, preferably 55 to 90% by mass, and more preferably 58 to 80% by mass. In case where water is separated from the decomposed oil, the yield of the decomposed oil is, for example, from 30 to 80% by mass, preferably 40 to 75% by mass, and more preferably 45 to 70% by mass.

With an increase in percentage of the organic polymer waste in the organic raw material, it becomes more difficult for water to be separated from the decomposed oil, for example, in case where the percentage of the organic polymer waste in the organic raw material is 30% by mass or more, in particular, the percentage is 50% by mass or more. In contrast, with a decrease in percentage of the organic polymer waste in the organic raw material, it becomes easier for water to be separated from the decomposed oil, for example, in case where the percentage of the organic polymer waste in the organic raw material is less than 30% by mass, in particular, the percentage is 20% by mass or less.

The percentage of hexane soluble fraction (HS) is, for example, from 70 to 99% by mass, preferably 80 to 99% by mass, and more preferably 90 to 99% by mass in 100% by mass of the decomposed oil. The percentage of hexane insoluble-THF soluble fraction (HI-THFS) is, for example, 30% by mass or less, preferably 20% by mass or less, more preferably 10% by mass or less, and further preferably 5% by mass or less in 100% by mass of the decomposed oil. The percentage of THF insoluble fraction (THFI) is, for example, 10% by mass or less, preferably 5% by mass or less, and more preferably 1% by mass or less in 100% by mass of the decomposed oil.

The percentage of the components having carbon numbers of 20 or less (light oil) contained in the HS components is, for example, from 70 to 99% by mass, preferably 75 to 95% by mass, and more preferably 78 to 90% by mass in 100% by mass of HS components. The yield (yield from comparison with raw material on dry basis) of the components having carbon numbers of 20 or less (light oil) is, for example, from 35 to 70% by mass. The percentage and the yield of the light oil is achieved even when the decomposed oil is separated.

[Heat Recovery Step]

In contrast, the component which has not been liquefied by cooling (off-gas) contains carbon dioxide, carbon monoxide, hydrogen, and CH hydrocarbons. The off-gas component may be combusted under the presence of oxygen, and the heat generated by the combustion can heat the carrier gas before introduction into the fluidized-bed-type decomposition apparatus (heat recovery step). The off-gas or the combustion gas of it may be used as an atmospheric gas for the organic raw material and/or the artificial carbon particle, or may be used as the carrier gas.

The yield of the off-gas is, for example, from 5 to 40% by mass, preferably 10 to 35% by mass, and more preferably 15 to 30% by mass.

[Decomposed Oil Separation Step]

The decomposed oil obtained in the gas-liquid separation step is preferably separated into a light cracked oil and a heavy cracked oil based on a difference in boiling point and/or a difference in solubility in a decomposed oil separation step. In the decomposed oil separation step, when utilizing a difference in boiling point, distillation (may be referred to as first distillation in this specification) is generally employed. When utilizing a difference in solubility, separation is conducted with at least one type of solvent selected from naphtha, an aviation fuel, kerosine, diesel fuel, and aliphatic hydrocarbons having equivalent boiling points with those solvents. The light cracked oil, reformed product of light cracked oil described later (for example, hydrogenated light cracked oil), and hexane soluble fraction (HS) described later may also be used as a solvent. The light cracked oil has high solubility in above solvents in contrast to heavy cracked oil having low solubility in above solvents. Accordingly, the solvent and the light cracked oil are mixed, solvent insoluble fraction emerges, and the decomposed oil can be separated into the light cracked oil and the heavy cracked oil through separation of the insoluble fraction by an appropriate separation means (sedimentation, centrifugation, filtration, and the like). The light cracked oil generally contains hexane soluble fraction (HS) described later. The heavy cracked oil (residual oil) generally contains hexane insoluble-THF soluble fraction (HI-THFS) and THF insoluble fraction (THFI) described later. The heavy cracked oil may be stored in a storage tank, if needed.

[Production Step of Solid Fuel]

Hexane insoluble-THF soluble fraction (HI-THFS) contained in the heavy cracked oil corresponds to asphaltene or pre-asphaltene, and THF insoluble fraction (THFI) corresponds to a precursor of carbonaceous material. Solid fuels (preferably solid biofuel) such as alternative coal (preferably bio-coal) and alternative coke (preferably bio-coke) can be produced by subjecting the solid residue and the heavy cracked oil to at least one type of treatment selected from mixing, mulling, and kneading, and then molding and/or firing, if needed.

[Production Step of Liquid Fuel]

The light cracked oil obtained in the decomposed oil separation step may further be distilled (hereinafter, referred to as second distillation) to produce a liquid fuel in a production step of liquid fuel.

The light cracked oil before being separated by the second distillation or the distillate obtained from the second distillation is preferably subjected to at least one type of reforming treatment selected from dehydrogenation, conversion, isomerization, hydrogenation, hydrocracking, and hydrotreating under the presence of a catalyst. The reforming treatment can contribute to increase in the yield (especially selectivity of the target liquid fuel) or the quality of liquid fuel.

Fractional distillation at the first distillation including multiple steps can double as the second distillation. When the first distillation doubles as the second distillation, the decomposed oil before separation in the first distillation or the distillate obtained from the first distillation is preferably subjected to at least one type of reforming treatment selected from dehydrogenation, conversion, isomerization, hydrogenation, hydrocracking, and hydrotreating under the presence of a catalyst. The reforming treatment can contribute to increases in the yield (especially selectivity of the target liquid fuel) or the quality of liquid fuel.

The fuel produced in the production step of liquid fuel is exemplified by naphtha (preferably bio-naphtha), an aviation fuel (preferably SAF (Sustainable aviation fuel)), kerosine (preferably bio-kerosine), and diesel fuel (preferably bio-diesel fuel).

[Re-Decomposition Step]

The heavy cracked oil obtained in the decomposed oil separation step may be used in the production step of solid fuel, may be re-decomposed instead of the use in the production step of solid fuel, or may be used in both ways. The remaining oil (stillage oil) which has not been distilled off in the second distillation of the production step of liquid fuel may be re-decomposed. Both heavy cracked oil and the stillage oil may be re-decomposed, or either of them may be re-decomposed. In the re-decomposition step, the heavy cracked oil and/or the stillage oil is returned to the decomposition step for reprocessing. The heavy cracked oil and/or the stillage oil may be directly returned to the decomposition step, or may be returned to the raw material supply step as a part of the organic raw material and then sent to the decomposition step.

[Decomposition Equipment]

Hereinafter, a decomposition equipment useful for above production method will be described with illustrated examples. However, the decomposition equipment of the present invention is not limited to the illustrated examples, and can be appropriately modified in accordance with the production method described above.

FIG. 1 is a schematic diagram illustrating an exemplary decomposition equipment of the present invention, and FIG. 2 is a schematic cross-sectional view of an exemplary decomposition apparatus of the decomposition equipment. The decomposition equipment shown in FIG. 1 comprises the fluidized-bed-type decomposition apparatus 21, and the decomposition of the organic raw material can be conducted under the presence of the artificial carbon particle in the decomposition apparatus 21. The organic raw material and the artificial carbon particle are treated in pretreatment apparatus 11 provided as needed (for example, impurities removal apparatus, moisture removal apparatus, and particle size adjuster such as grinding apparatus, granulation apparatus, and classification apparatus) and raw material blender (for example, mixer, muller, kneader, or granulation apparatus), and then supplied into the reaction tube 25 from the raw material supply port 22 provided at an upper portion of the decomposition apparatus 21. The supplied organic raw material and the artificial carbon particle are received over the filter 30 mounted at the bottom of the reaction tube 25 and then form the fluidized-bed 29 with the carrier gas supplied through the carrier gas line 27 below the filter 30. The organic raw material is supplied from the raw material supply port 22 while the reaction tube 25 being heated by the heating furnace 28 covering the outer circumference of the reaction tube 25, and the organic material is decomposed in the reaction tube 25 and separated into solid residues and non-solid decomposed components. The non-solid decomposition component is discharged from the reaction tube 25 through the gas discharge line 26 provided at an upper portion of the reaction tube 25. The amount of the organic raw material and the artificial carbon particle to be supplied can be controlled by a supply volume control unit 24 equipped directly under the raw material supply port 22. A replacement line for non-oxygen containing gas 23 is connected to the raw material supply port 22, enabling replacement of the atmosphere surrounding the raw materials by sending a non-oxygen containing gas in the direction reverse to the raw material supply direction. The decomposition apparatus may have two or more of raw material supply ports 22 for separate supply of the raw materials depending on their types. The carrier gas is supplied from a gas container 12, and the flow rate of the gas can be controlled by a mass flow controller (MFC) 13 installed in the carrier gas line 27.

The solid residue generated in the reaction tube 25 is discharged from an outlet 71, and stored in a storage unit 72, if needed. The discharged solid residue is activated in an activator 81, and refined in a refiner 82, if needed, to be made into activated charcoal. The solid residue and the activated charcoal can be reused as the artificial carbon particle through the recycling system 74 (transport device), after particle size adjustment in a particle size adjuster 73 (for example, grinding apparatus, granulation apparatus, or classification apparatus), if needed.

The non-solid decomposition component discharged from the reaction tube 25 is cooled in a cooler 31. To the cooler 31, a gas-liquid separation tank 32 to store liquefied component is connected, and the discharged non-solid decomposition component is separated into a decomposed oil and an off-gas in it. The off-gas is sent to a heat exchanger 61 together with air and then combusted under the presence of a catalyst. The carrier gas line 27 is running through the heat exchanger 61 and reaches the reaction tube 25, enabling the carrier gas to be heated by the combustion heat generated in the heat exchanger 61 and then sent to the reaction tube 25.

The decomposed oil separated in the gas-liquid separation tank 32 is sent to separation apparatus 41 (first distillation column in the exemplary illustration, and the separation apparatus may be a combination of a mixer of the decomposed oil and a solvent with a separator of insoluble fraction) to be separated into a light cracked oil and a heavy cracked oil. The heavy cracked oil is mixed, mulled, or kneaded with the solid residue with a mixer, muller, or kneader, which are numbered 91, and after that, the mixture is treated with a molding machine or a firing furnace, which are numbered 92, if needed, to produce a solid fuel.

In contrast, the light cracked oils separated in the separation apparatus 41 is reformed in the reforming furnace 51 containing a catalyst (dehydrogenation, conversion, isomerization, hydrogenation, hydrocracking, and hydrotreating), and then rectified in the second distillation column 52 to generate liquid fuels such as naphtha, an aviation fuel, kerosine, and diesel fuel.

The heavy cracked oil separated in the separation apparatus 41, and the stillage oil discharged from the bottom of the second distillation column 52 can be supplied to the fluidized-bed-type decomposition apparatus 21 from the raw material supply port 22 through a return line 75 (re-decomposition system). In the illustrated example, the return line 75 is connected to the pretreatment apparatus 11, thereby enabling the heavy cracked oil and the stillage oil to be used as an organic raw material.

The present application claims benefit of priority to Japanese Patent Application No. 2021-068497 filed on Apr. 14, 2021 and International Patent Application No. PCT/JP2021/036613 filed on Oct. 4, 2021. The entire contents of the specification of Japanese Patent Application No. 2021-068497 filed on Apr. 14, 2021 and International Patent Application No. PCT/JP2021/036613 filed on Oct. 4, 2021 are incorporated herein for reference.

EXAMPLES

Hereinafter, the present invention will be specifically described with Examples, however, the scope of the present invention is not limited by the Examples. The present invention can be carried out with modifications within a range conforming to the gist described above and/or below, and all of which are included in the technical scope of the present invention.

The biomass, the organic polymer waste, and the artificial carbon particle used in the following Examples are as follows. The decomposed oil generated in the decomposition step (separated liquid by distillation) was measured to determine yield and compositional distribution in it, and the solid residue, loss fraction, and off-gas were also measured by the following methods to determine yields.

(1) Biomass

Cedar powder: Japanese cedar sawdust was classified under the size of 4 mm with a sieve and dried at 120° C. overnight.

Jatropha: seeds of Vietnamese Jatropha (provided by REVO International Inc.) were dried naturally, milled, classified into the size of 4 mm or less by classification with a sieve, and moreover dried at 120° C. overnight. In the sample, the percentage of seed husks was 43.22 wt %, and the main component of the part other than seed husk was fat and oil.

Neutralized oil cake: neutralized oil cake was provided by The Nisshin OilliO Group, Ltd. (fatty acid: 87.5 wt %, moisture: 2.5 wt %, crude ash 10.0 wt %, and viscous liquid). The neutralized oil cake has the characteristics of both of biomass and organic acids.

Palm stearic acid: palm oil is contained in the fruit of oil palms. Stearic acid is a component contained in a palm oil. The palm stearic acid was obtained from Thailand.

Used cooking oil: used cooking oil was collected from restaurants, homes, etc. The oil was washed, drained, and filtered to be used.

(2) Organic Polymer Waste

Simulated waste plastic (abbreviation: waste plastic): simulated waste plastic was prepared by mixing polyethylene (PE) (product name: NOVATEC LD-LJ803, manufactured by Japan Polyethylene (Corp.)), polypropylene (PP) (product name: NOVATEC PP-MA3, manufactured by Japan Polypropylene Corp.), and polystyrene (PS) (product name: GPPS-HF77, manufactured by PS Japan Corp.) at a mass ratio of PE:PP:PS=49:33:18. According to Plastic Waste Management Institute, PE, PP, and PS constitute two-thirds of waste plastic at the mass ratio of PE:PP:PS=49:33:18. The simulated waste plastic was a blend containing plastic based on the actual composition of waste plastic. All of PE, PP, and PS had a particle size of 4 mm or less and 2 mm or more by classification with a sieve.

(3) Artificial Carbon Particle and Activated Charcoal

AC (activated charcoal): granular activated charcoal (manufactured by UES Co., Ltd., product name: Vitality granular charcoal (for water)), with the particle size of 0.84 to 0.3 mm through classification by an opening of a sieve (20 to 50 mesh), and apparent density of 0.51 g/cm$^3$.

R1 (artificial carbon particle): R1 was prepared by mixing the cedar powder, Jatropha, and waste plastic in equal amounts (on a mass basis) and carbonizing the mixture by heating at 500° C. for 2 hours under nitrogen atmosphere. The particle size was 0.6 to 1.6 mm through classification by an opening of a sieve, and apparent density was 0.43 g/cm$^3$.

R2 (artificial carbon particle): R2 was prepared in the same manner as R1 except that carbonization temperature was 600° C. and the particle size (through classification by an opening of a sieve) was 0.6 to 2.0 mm. Apparent density was 0.32 g/cm$^3$.

R2+2% MgO (artificial carbon particle): a mixture of 100 parts by mass of R2 and 2% parts by mass of MgO.

R3 (artificial carbon particle): R3 was prepared by mixing the cedar powder and used cooking oil in equal amounts (on a mass basis), and carbonizing the mixture by heating at 450° C. for 2 hours under nitrogen atmosphere. Particle size was 2 mm or less through classification by an opening of a sieve, and apparent density was 0.24 g/cm$^3$.

CC (artificial carbon particle): CC was prepared by carbonizing rice husks (provided by REVO International Inc.) by heating at 600° C. for 2 hours under nitrogen atmosphere. The carbonized product may be referred to as rice husk charcoal. Particle size of CC was 2 mm or less through classification by an opening of a sieve, and apparent density was 0.15 g/cm$^3$.

R20 (artificial carbon particle): R20 was a solid residue left in a reaction tube by the thermal decomposition conducted in the same manner as in Example 1. The differences from Example 1 are as follows; the artificial carbon particle was 20 g of R2 and 189 g of raw material mixture consisting of 30% by mass of cedar powder, 15% by mass of palm stearic acid, 10% by mass of used cooking oil, 5% by mass of neutralized oil cake, and 40% by mass of waste plastic was supplied. With respect to other differences from Example 1, the mixture was supplied to a reaction tube at a rate of 0.12 g per minute, the internal temperature of the reaction tube was 525° C., and the nitrogen flow rate was 200 ml per minute.

Both of the artificial carbon particle and the activated charcoal were dried at 120° C. overnight before use.

(4) Decomposed Oil Yield (Production Rate of Separated Liquid by Distillation)

The yield of the decomposed oil obtained in the decomposition step was determined according to the following equation.

Yield of decomposed oil (% by mass)=mass of decomposed oil/dry mass of raw material×100

In the equation, mass of the decomposed oil was calculated from the total mass difference before and after operation of the gas-liquid separation tank and the piping. The dry mass of the raw material was calculated by subtracting moisture content from the total input mass of the biomass and the organic polymer waste.

(5) Solid Residue Yield

The solid residue yield after the decomposition step was determined according to the following equation.

Solid residue yield(% by mass)=mass of solid residue/dry mass of raw material×100

In the equation, dry mass of the raw material means the same as above. Mass of the solid residue generated by the reaction was determined (1) directly from the mass difference before and after operation of reaction tube when the carbon particle (artificial carbon particle or activated charcoal) was not used, or (2) from the following equation when the carbon particle (artificial carbon particle or activated charcoal) was used.

Mass of solid residue=total mass of reaction tube after operation−(mass of reaction tube before operation+mass of carbon particle).

(6) Loss Fraction Ratio

Loss fraction was defined as the substance which had not been neither carbonized yet nor liquefied after the completion of the decomposition step and adhering to the inside and the outside of an outlet of the raw material supply tube disposed at the top portion of the fluidized-bed-type decomposition apparatus (reaction tube). In order to calculate loss fraction ratio, the mass of the raw material supply tube before the start of the decomposition process (W1) and the mass of the raw material supply tube after the completion of the decomposition process (W2) were measured. The loss fraction ratio was calculated according to the following equation.

Loss fraction ratio(% by mass)=mass of loss fraction/dry mass of raw material×100

In the equation, loss fraction is a value determined by W2−W1. The dry mass of the raw material means the same as above.

(7) Off-Gas Yield

The off-gas yield was determined according to the following equation.

Off-gas yield(% by mass)={(dry mass of raw material−(mass of decomposed oil+mass of solid residue+mass of loss fraction))/dry mass of raw material}×100

In the equation, dry mass of the raw material, mass of the decomposed oil, mass of the solid residue, and mass of the loss fraction mean the same as above.

(8) Compositional Distribution in Decomposed Oil (Separated Liquid by Distillation)

The decomposed oil (separated liquid by distillation) produced in the decomposition step was fractionated into three parts with solvents of tetrahydrofuran (THF) and hexane (HS) by solvent extraction and filtration method, specifically, into THF insoluble fraction (THFI), hexane insoluble-THF soluble fraction (HI-THFS), and hexane soluble fraction (HS).

THFI ratio: 2 g of the decomposed oil was mixed with 200 ml of THF, and the decomposed oil was dissolved and suspended in THF by irradiating ultrasonic waves (frequency: 35 kHz, energy: 36 kJ (60 W×10 minutes)) until the insoluble components were completely dispersed. i.e., until no change in appearance was seen. After that, the mixture was filtrated with Filter paper No. 2 for chemical analysis (conforming to JIS P 3801 standard, manufactured by ADVANTEC TOYO KAISHA, LTD.) to be separated into insoluble fraction (THFI) and filtrate. After the filtration, the filter paper was washed 5 times each with 20 ml of THF under suction, and the filter paper was dried at 107° C. for 1 hour. Then, the dried filter paper was weighed, and the weight of the insoluble fraction (mass of THFI) was determined by subtracting the weight of filter paper from the dried filter paper. The ratio of insoluble fraction (THFI ratio) was determined according to the following equation.

THFI ratio (% by mass)=mass of THFI/mass of decomposed oil×100

HI ratio: 2 g of the decomposed oil was mixed with 200 ml of hexane, and the decomposed oil was dissolved and suspended in hexane by irradiating ultrasonic waves (frequency: 35 kHz, energy: 36 kJ (60 W×10 minutes)) until the insoluble components were completely dispersed, i.e., until no change in appearance was seen. After that, the mixture was filtrated with Filter paper No. 2 for chemical analysis (conforming to JIS P 3801 standard, manufactured by ADVANTEC TOYO KAISHA, LTD.) to be separated into insoluble fraction (HI) and filtrate. After the filtration, the filter paper was washed 5 times each with 20 ml of hexane under suction, and the filter paper was dried at 107° C. for 1 hour. Then, the dried filter paper was weighed, and the weight of the insoluble fraction (mass of HI) was determined by subtracting the weight of filter paper from the dried filter paper. The ratio of insoluble fraction (HI ratio) was determined according to the following equation.

HI ratio(% by mass)=mass of HI/mass of decomposed oil×100

HS ratio: HS ratio was determined according to the following equation based on the calculation result of the HI ratio.

HS ratio(% by mass)=(mass of decomposed oil−mass of HI)/mass of decomposed oil×100

HI-THFS ratio: HI-THFS ratio was determined according to the following equation based on the calculation result of the THFI and HS ratios.

HI-THFS ratio(% by mass)=100−(HS ratio+THFI ratio)

(9) HS Yield (Production Rate of HS)

According to the following equation, HS yield(% by mass) based on raw material input was calculated.

HS yield(% by mass)=decomposed oil yield(% by mass)×HS ratio(% by mass)/100

(10) Componential Distribution in HS

A sample to be analyzed was prepared by dissolving 0.1 g of the decomposed oil in 2.0 g of THF. The mixture was analyzed to determine componential distribution in HS by gas chromatography under the following conditions. The components were classified into groups based on carbon numbers of hydrocarbons: hydrocarbons with carbon numbers of 8 or less ($C_8$ or less), hydrocarbons with carbon numbers of 9 to 14 ($C_{9-14}$), hydrocarbons with carbon numbers of 15 to 20 ($C_{15-20}$), and hydrocarbons with carbon numbers of 21 or more ($C_{21}$ or more), and the percentage of each group was determined. Since the decomposed oil was liquid at room temperature, hydrocarbons with carbon numbers of 8 or less were substantially free from hydrocarbons with carbon numbers of 4 or less, and the hydrocarbons were substantially hydrocarbons with carbon numbers of 5 to 8. The total percentage of hydrocarbons with carbon numbers of 8 or less, 9 to 14, and 15 to 20 was defined as a percentage(%) of a light oil.

[Gas Chromatographic Conditions]
Gas Chromatograph: GC-2014, manufactured by Shimadzu Corporation
Column: DB-1 (φ: 0.32 mm×60 m, film thickness: 1 μm, manufactured by Agilent Technologies)
Sample injection amount: 1 μL
Vaporization chamber temperature: 300° C.
Oven (column chamber): from 50° C. to 320° C. (10° C./min), retained at 320° C. for 33 minutes
Detector: FID (330° C.)
Carrier gas: helium
Carrier gas control mode: constant pressure (125 kPa)
Method of determining composition ratio (%): calculated based on area ratio of peak
Identification of each composition component: chromatographic data presented as a graph was divided into 4 parts based on reference peaks of n-octane, n-tetradecane, and n-eicosane identified by retention time, and the percentages of the following compositional component in each range were calculated by the following method and equation.

$C_8$ or less: the percentage was calculated by subtracting the THF peak area from the total area of peaks until n-octane.

$C_{9-4}$: the percentage was calculated based on the total area of peaks from peak next to n-octane to n-tetradecane.

$C_{15-20}$: the percentage was calculated based on the total area of peaks from peak next to n-tetradecane to n-eicosane.

$C_{21}$ or more: the percentage was calculated based on the total area of peaks after the next peak of n-eicosane.

Percentage of each composition component(%)=total area of peaks of composition component of interest/(total area of peaks−THF peak area)×100

(11) Light Oil Yield (Production Rate)

Light oil yield (production rate) was determined according to the following equation.

Light oil yield(%)=decomposed oil yield(% by mass)×percentage of light oil(%)/100

Example 1

As shown in FIG. 2, a stainless-steel reaction tube 25 with a vertical electric furnace heating system (internal diameter: 42.4 mm, cross-sectional area of the reaction tube: 1.41× $10^{-3}$ $m^2$) was used as the fluidized-bed-type decomposition apparatus 21. At the bottom of the reaction tube 25, a 200-mesh filter 30 was mounted, and then the artificial carbon particle (In Example 1, 20 g of R1) was supplied in advance from the raw material supply tube disposed at the top of the reaction tube to form a layer filled with the artificial carbon particle (fluidized-bed 29). The reaction tube was heated until the internal temperature reached 450° C. while nitrogen was being supplied from the bottom of the reaction tube at a flow rate of 200 ml per minute. After the temperature was stabilized, the raw material mixture in the atmosphere replaced with nitrogen (in Example 1, a mixture of 18 g of cedar powder and 18 g of waste plastic) was supplied from a raw material supply port 22 to the layer filled with the artificial carbon particle (fluidized-bed 29) in the reaction tube at a supply rate of 0.12 g per minute, so that the raw material mixture would be decomposed while being supplied. After all the mixture was supplied, the reaction tube 25 was retained at the same temperature for further 30 minutes, and then air-cooled. The component (separated component by distillation) generated by the decomposition of the organic raw material and discharged from the top of the reaction tube (gas discharge line 26) was separated into gas and liquid by a two-stage cooling trap (−10° C. to −20° C.), and then the temperature in the cooling trap was brought back to room temperature to generate liquid product (decomposed oil (separated liquid by distillation)). The liquid product in the trap was collected and quantified. The residue generated in the reaction tube 25 was cooled in nitrogen gas flow by cooling the reaction tube to room temperature, and then quantified and collected. Table 1 shows the results.

Example 2, Comparative Example 1, and Reference Examples 1 to 4

Reaction was conducted in the same manner as Example 1 except for changes in internal temperature of the reaction tube, nitrogen flow rate, type and amount of the artificial carbon particle, and type and amount of the organic raw material, as shown in Table 1. In Reference Examples 1 to 4, AC was substituted for the artificial carbon particle. Table 1 shows the results.

TABLE 1

| | Carrier | | Artificial carbon particle or activated charcoal | | Raw material mixture (dry basis) | | | | Decomposition product yield (wt %) | |
|---|---|---|---|---|---|---|---|---|---|---|
| | Temperature (° C.) | gas $N_2$ (ml/min) | AC (g) | R1 (g) | Neutralized oil cake (g) | Organic raw material | | Supply rate (g/min) | | |
| | | | | | | Cedar powder (g) | Waste plastic (g) | | Decomposed oil | Water |
| Example 1 | 450 | 200 | | 20 | | 18.00 | 18.00 | 0.12 | 88.9 | Not separated |
| Example 2 | 450 | 200 | | 20 | 2.00 | 18.00 | 18.00 | 0.12 | 70.7 | Not separated |
| Comparative Example 1 | 450 | 200 | | | | 18.00 | 18.00 | 0.12 | 52.3 | Not separated |
| Reference Example 1 | 450 | 200 | 20 | | | 18.00 | 18.00 | 0.12 | 67.7 | Not separated |
| Reference Example 2 | 500 | 200 | 20 | | | 86.00 | 0.00 | 0.12 | 46.2 | Not separated |
| Reference Example 8 | 500 | 200 | 20 | | | | 38.00 | 0.12 | 69.3 | Not separated |
| Average of Reference Examples 2 and 8 | 500 | 200 | 20 | | | 18.00 | 18.00 | 0.12 | 57.8 | Not separated |
| Reference Example 4 | 500 | 200 | 20 | | | 18.00 | 18.00 | 0.12 | 62.8 | Not separated |

| | Decomposition product yield (wt %) | | | Decomposed oil composition (wt %) | | | HS yield (wt %) |
|---|---|---|---|---|---|---|---|
| | Solid residue | Off-gas | Loss fraction | HS | HI-THFS | THFI | |
| Example 1 | 14.2 | 13.8 | 3.1 | 97.0 | 2.7 | 0.4 | 86.8 |
| Example 2 | 13.1 | 14.8 | 1.3 | 96.3 | 3.1 | 0.6 | 88.1 |
| Comparative Example 1 | 23.9 | 20.2 | 3.6 | 85.0 | 14.5 | 0.5 | 44.5 |
| Reference Example 1 | 13.7 | 16.6 | 1.9 | 97.1 | 2.0 | 0.9 | 65.8 |
| Reference Exarople 2 | 24.2 | 26.9 | 2.7 | 78.88 | 21.08 | 0.08 | 36.5 |
| Reference Example 8 | 4.5 | 25.3 | 0.8 | 99.96 | 0.02 | 0.02 | 89.3 |
| Average of Reference Examples 2 and 8 | 14.4 | 26.1 | 1.8 | 89.42 | 10.53 | 0.05 | 51.7 |
| Reference Example 4 | 9.6 | 27.0 | 0.6 | 93.70 | 5.73 | 0.57 | 58.8 |

The comparison of Comparative Example 1, Example 1, and Reference Example 1 shows that decomposition in the presence of the activated charcoal (AC) or the artificial carbon particle (R1) could lead to significant increase in the decomposed oil yield in the decomposition of the organic raw material, which was supplied to the fluidized-bed-type decomposition apparatus to be decomposed into the decomposed oil, solid residue, off-gas, and loss fraction. The artificial carbon particle (R1) is more readily available than activated charcoal (AC) because of unnecessity of inactivation, and the comparison of Reference Example 1 and Example 1 shows that R1 attained high yields of decomposed oil and HS equivalent to those of AC. In particular, the comparison of Example 2 and Example 1 shows that the combination of the organic acids originating from the neutralized oil cake with the artificial carbon particle could further enhance the decomposed oil yield than the case of the artificial carbon particle alone. This is because the combination of the organic acids originating from the neutralized oil cake and the artificial carbon particle could further enhance catalytic activity, allowing catalytic cracking of the raw material to occur.

Reference Example 4 where activated charcoal was used was the case in which the organic raw material was the mixture of the cedar powder and the waste plastic. In the case, synergistic effects of the raw material were shown, specifically with an increase in decomposed oil yield and a decrease in residue, compared to the cases of cedar powder alone (Reference Example 2) and waste plastic alone (Reference Example 3).

Specifically, Reference Examples 4 shows synergistic effects that the decomposed oil was generated with an increase in yield and a decrease in solid residue, and also with regard to the components in the decomposed oil, HS percentage was increased with a decrease in HI-THFS percentage, compared to the expectation from the arithmetic mean values of Reference Example 2 (cedar powder) and Reference Example 3 (waste plastic).

Examples 3 to 9

Reaction was conducted in the same manner as Example 1 except that the supply rate of the raw material mixture was changed to 0.15 g per minute and that the internal temperature of the reaction tube, nitrogen flow rate, type and amount of the artificial carbon particle, and type and amount of the raw material mixture were changed as shown in Table 2. Table 2 shows the results.

TABLE 2

|  | Temperature (° C.) | Carrier gas $N_2$ (ml/min) | Artificial carbon particle | | | | Raw material mixture (dry basis) | | | | | Supply rate (g/min) |
|---|---|---|---|---|---|---|---|---|---|---|---|---|
|  |  |  |  |  |  |  | Neutralized oil cake (g) | Organic raw material | | | | |
|  |  |  | R2 (g) | R3 (g) | CC (g) | R20 (g) |  | Palm stearic acid (g) | Cedar powder (g) | Used cooking oil: UCO (g) | Waste plastic (g) |  |
| Example 3 | 450 | 200 | 20 |  |  |  | 1.80 | 5.40 | 10.80 | 3.60 | 14.40 | 0.15 |
| Example 4 | 475 | 200 | 20 |  |  |  | 1.80 | 5.40 | 10.80 | 3.60 | 14.40 | 0.15 |
| Example 5 | 500 | 200 | 20 |  |  |  | 1.80 | 5.40 | 10.80 | 3.60 | 14.40 | 0.15 |
| Example 6 | 525 | 200 | 20 |  |  |  | 1.80 | 5.40 | 10.80 | 3.60 | 14.40 | 0.15 |
| Example 7 | 500 | 200 |  |  |  | 20 | 1.80 | 5.40 | 10.80 | 3.60 | 14.40 | 0.15 |
| Example 8 | 475 | 200 |  |  | 20 |  | 1.80 | 5.40 | 10.80 | 3.60 | 14.40 | 0.15 |
| Example 9 | 450 | 200 |  | 20 |  |  | 1.80 | 5.40 | 10.80 | 3.60 | 14.40 | 0.15 |

|  | Decomposition product yield (wt %) | | | | | Decomposed oil composition (wt %) | | | HS yield (wt %) |
|---|---|---|---|---|---|---|---|---|---|
|  | Decomposed oil | Water | Solid residue | Off-gas | Loss fraction | HS | HI-THFS | THFI |  |
| Example 3 | 75.0 | Not separated | 0.0 | 14.7 | 1.3 | 96.7 | 3.2 | 0.14 | 72.5 |
| Example 4 | 74.0 | Not separated | 8.0 | 16.6 | 0.4 | 97.4 | 1.5 | 1.10 | 72.1 |
| Example 5 | 71.6 | Not separated | 5.3 | 17.1 | 2.9 | 98.4 | 1.5 | 0.10 | 70.4 |
| Example 6 | 82.9 | Not separated | 7.7 | 27.1 | 2.3 | 97.6 | 2.4 | 0.03 | 61.4 |
| Example 7 | 70.9 | Not separated | 8.8 | 18.1 | 2.4 | 98.3 | 1.0 | 0.70 | 69.7 |
| Example 8 | 75.5 | Not separated | 7.9 | 16.0 | 0.8 | 90.7 | 1.8 | 1.80 | 73.0 |
| Example 9 | 75.0 | Not separated | 8.8 | 15.3 | 0.5 | 88.8 | 0.7 | 0.50 | 74.4 |

Examples 3 to 6 were examples of decomposition tests of raw material mixtures which were combinations of different organic acids (originating from fats and oils), different organic raw materials (woody biomass, biomass originating from fats and oils, and waste plastic), and the artificial carbon particle (R2), and the Examples showed that the mixtures could be thermally decomposed at different temperatures. The solid residue (R20) obtained in the thermal decomposition step could be used as an artificial carbon particle as shown in Example 7, thereby showing that both of the production and the decomposition of the artificial carbon particle could be conducted in the thermal decomposition step. The rice husk charcoal (CC) could also be used as an artificial carbon particle as shown in Example 8. Example 9 was the example in which both production temperature of the artificial carbon particle and the thermal decomposition temperature of the organic raw material by using the artificial carbon particle were 450° C., illustrating that the same production and use temperatures of the artificial carbon particle enabled high thermal decomposability.

Example 10

A mixture of 3.40 g of the decomposed oil produced in Example 6, 3.40 g of nickel-supported catalyst (type: N102F, component: 61 wt % Ni/SiO$_2$·MgO, manufactured by and available from JGC Chemical Co., Ltd.), and 30.60 g of n-heptane was prepared. The mixture was hydrogenated under the following conditions: an initial hydrogen pressure of 2.6 MPa (gauge pressure at 25° C.), a reaction temperature of 325° C., a retention time of 150 minutes, and a stirring speed of 1000 rpm (equipment for hydrogenation: 120 mL stainless steel autoclave). Samples for composition analysis were prepared from each of the decomposed oil and a hydrogenated additive of it. Measurement was conducted in the same manner as the analysis of HS componential distribution based on carbon numbers, except that the samples were prepared with a solvent of n-heptane instead of THF. Table 3 shows the results.

TABLE 3

| | | HS componential distribution (%) | | | | |
|---|---|---|---|---|---|---|
| | | $C_8$ or less | $C_{9-14}$ | $C_{15-20}$ | $C_{21}$ or more | Light oil percentage ($C_{20}$ or less) |
| Example 10 | Decomposed oil | 38.0 | 30.2 | 22.2 | 9.6 | 90.4 |
| | Hydrogenated additive of decomposed oil | 37.9 | 24.5 | 25.5 | 12.2 | 87.8 |

Each of the decomposed oil and the hydrogenated additive of it had high light oil percentage, and this shows that the method according to the present invention has an advantage in the production of a light oil containing components having carbon numbers of 20 or less which are exemplified by naphtha, an aviation fuel, kerosine, and diesel fuel.

Example 11

As shown in FIG. 2, a stainless-steel reaction tube 25 with a vertical electric furnace heating system (internal diameter: 42.4 mm, cross-sectional area of the reaction tube: $1.41 \times 10^{-3}$ $m^2$) was used as the fluidized-bed-type decomposition apparatus 21. At the bottom of the reaction tube 25, a 200-mesh filter 30 was mounted, and then artificial carbon particle (in Example 11, 8 g of R2) was supplied in advance from the raw material supply tube disposed at the top of the reaction tube to form a layer filled with the artificial carbon particle (fluidized-bed 29). The reaction tube was heated until the internal temperature reached 475° C. while nitrogen was being supplied from the bottom of the reaction tube at a flow rate of 200 ml per minute. A raw material mixture (in Example 11, 18 g of cedar powder and 18 g of used cooking oil) and the artificial carbon particle (in Example 11, 12 g of R2) were mixed, and the atmosphere was replaced with nitrogen (mixture A). After the temperature of the reaction tube 25 was stabilized, the mixture A was supplied from the raw material supply port 22 to the layer filled with the artificial carbon particle (fluidized-bed 29) in the reaction tube, at a supply rate of 0.20 g per minute (equal to a supply rate of the raw material mixture of 0.15 g per minute, and a supply rate of the artificial carbon particle of 0.05 g per minute), so that the raw material mixture would be decomposed while being supplied. After all the mixture A was supplied, the reaction tube 25 was retained at the same temperature for further 30 minutes, and then air-cooled. The component (separated component by distillation) generated by the decomposition of the organic raw material and discharged from the top of the reaction tube (gas discharge line 26) were separated into gas and liquid by a two-stage cooling trap ($-10°$ C. to $-20°$ C.), and then the temperature in the cooling trap was brought back to room temperature to generate liquid product (decomposed oil (separated liquid by distillation)). The liquid product in the trap was collected and quantified. The residue generated in the reaction tube 25 was cooled in nitrogen gas flow by cooling the reaction tube to room temperature, and then quantified and collected.

Examples 12 to 14 and Comparative Example 2

Reaction was conducted in the same manner as Example 11 except that the type and amount of artificial carbon particle was changed as shown in Table 4. Table 4 and 5 show the results.

TABLE 4

| | | | Artificial carbon particle | | | | | | Raw material mixture | | | | Supply rate of mixture A (mixture of artificial carbon particle and raw material mixture) |
|---|---|---|---|---|---|---|---|---|---|---|---|---|---|---|
| | | | Before supply of raw material mixture | | | Supply with raw material mixture | | | | (dry basis) | | | | |
| | | | | | | | | | | | Used cooking | | | |
| | Temperature (° C.) | Carrier gas $N_2$ (ml/min) | R2 (g) | CC (g) | R2 + 2% MgO (g) | R2 (g) | CC (g) | R2 + 2% MgO (g) | Supply rate (g/min) [a] | Cedar powder (g) | oil: UCO (g) | Waste plastic (g) | Supply rate (g/min) [b] | (g/min) [a] + [b] |
| Comparative Example 2 | 475 | 200 | | | | | | | | 18.00 | 18.00 | 0.00 | 0.15 | 0.15 |
| Example 11 | 475 | 200 | 8 | | | 12 | | | 0.05 | 18.00 | 18.00 | 0.00 | 0.15 | 0.20 |
| Example 12 | 475 | 200 | | 8 | | | 12 | | 0.05 | 18.00 | 18.00 | 0.00 | 0.15 | 0.20 |
| Example 13 | 475 | 200 | | | 8 | | | 12 | 0.05 | 18.00 | 18.00 | 0.00 | 0.15 | 0.20 |

TABLE 5

| | Decomposition product yield (wt %) | | | | | Decomposed oil composition (wt %) | | |
|---|---|---|---|---|---|---|---|---|
| | Decomposed oil | Water | Solid residue | Off-gas | Loss fraction | HS | HI-THFS | THFI |
| Comparative Example 2 | 49.8 | 15.6 | 14.2 | 20.1 | 0.3 | 96.1 | 3.8 | 0.09 |
| Example 11 | 48.8 | 16.5 | 13.7 | 20.7 | 0.3 | 97.9 | 2.1 | 0.03 |
| Example 12 | 49.5 | 15.5 | 13.7 | 21.0 | 0.3 | 95.1 | 4.8 | 0.09 |
| Example 13 | 47.4 | 17.1 | 15.3 | 20.2 | 0.1 | 97.8 | 2.1 | 0.12 |

| | HS componential distribution (%) | | | | | | |
|---|---|---|---|---|---|---|---|
| | $C_8$ or less | $C_{9-14}$ | $C_{15-20}$ | $C_{21}$ or more | Light oil percentage ($C_{20}$ or less) | Light oil yield (%) | HS yield (wt %) |
| Comparative Example 2 | 10.9 | 29.2 | 28.8 | 31.1 | 68.9 | 34.3 | 47.9 |
| Example 11 | 13.7 | 44.0 | 31.1 | 11.2 | 88.8 | 43.3 | 47.8 |
| Example 12 | 7.8 | 88.6 | 38.6 | 20.5 | 78.5 | 39.4 | 47.1 |
| Example 18 | 9.1 | 31.5 | 37.5 | 23.7 | 76.3 | 36.2 | 46.3 |

In Examples 11 to 13 and Comparative Example 2 where raw material mixtures did not contain waste plastic, water was separated from the decomposed oil. The percentage of the light oil (hydrocarbons of $C_{20}$ or less) in HS components and the yield of the light oil were improved when the artificial carbon particle was used as shown in Examples 11 to 13, compared to Comparative Example 2 where artificial carbon particle was not used.

INDUSTRIAL APPLICABILITY

The production methods and the decomposition equipment according to the present invention have advantages in the production of a liquid fuel, a solid fuel, and activated charcoal, particularly in the production of a liquid fuel.

EXPLANATION OF LETTERS OR NUMERALS

11: Pretreatment apparatus
12: Gas container
13: Mass flow controller
21: Fluidized-bed-type decomposition apparatus
22: Raw material supply port
23: Replacement line with non-oxygen containing gas
24: Supply volume control unit
25: Reaction tube
26: Gas discharge line
27: Carrier gas line
28: Heating furnace
29: Fluidized-bed
30: Filter
31: Cooler
32: Gas-liquid separation tank
41: Separation apparatus (first distillation column in an illustrated example)
51: Reforming furnace
52: Second distillation column
61: Heat exchanger
71: Outlet
72: Storage unit
73: Particle size adjuster
74: Recycling system
75: Return line (re-decomposition system)
81: Activator
82: Refiner
91: Mixer, muller, kneader
92: Molding machine, firing furnaces

The invention claimed is:

1. A method for producing a liquid fuel, comprising:
a raw material supply step of supplying an organic raw material containing biomass and/or organic polymer waste, and an artificial carbon particle other than activated charcoal to a fluidized-bed-type decomposition apparatus,
a decomposition step of decomposing the organic raw material into a non-solid decomposition component and a solid residue while fluidizing the artificial carbon particle with introducing an inert gas containing oxygen at a concentration of 3% by volume or less as a carrier gas to the fluidized-bed-type decomposition apparatus, to discharge the non-solid decomposition component with the carrier gas as well as to discharge the solid residue separately from the non-solid decomposition component,
a gas-liquid separation step of separating the non-solid decomposition component discharged from the fluidized-bed-type decomposition apparatus into an off-gas component and a decomposed oil by cooling,
a step of reforming the decomposed oil by conducting at least one type of reforming treatment selected from dehydrogenation, conversion, isomerization, hydrogenation, hydrocracking, and hydrotreating under the presence of a catalyst, to produce reformate, and
a step of distilling the reformate, wherein
the artificial carbon particle is a granular carbonized product.

2. The method according to claim 1, wherein the decomposition step is conducted at a temperature of from 400 to 600° C.

3. The method according to claim 1, wherein the organic raw material is decomposed through catalytic decomposition by the artificial carbon particle.

4. The method according to claim 1, wherein the method comprises a step of recycling by returning at least a part of the solid residue discharged from the decomposition step to the raw material supply step as the artificial carbon particle before the solid residue is cooled to room temperature.

5. The method according to claim 1, wherein the method comprises a step of returning at least a part of the solid residue discharged from the decomposition step to the raw material supply step as the artificial carbon particle with or without particle size adjustment.

6. The method according to claim 1, wherein the artificial carbon particle has a specific surface area of 500 $m^2/g$ or less.

7. The method according to claim 1, wherein the artificial carbon particle contains a metal atom in an amount of 20% by mass or less.

8. The method according to claim 1, wherein the artificial carbon particle contains a solid base or a solid acid.

9. The method according to claim 1, wherein, in the raw material supply step, the organic raw material is subjected to at least one type of pretreatment selected from impurities removal, moisture removal, particle size adjustment, and raw material blending, to be supplied to the fluidized-bed-type decomposition apparatus.

10. The method according to claim 1, wherein, in the raw material supply step, at least one selected from the organic raw material, the artificial carbon particle, and a mixture of the organic raw material and the artificial carbon particle is continuously supplied to the fluidized-bed-type decomposition apparatus.

11. The method according to claim 1, wherein the biomass is at least one type selected from lignocellulosic biomass and biomass of fat derived from an oil plant, and the organic polymer waste is at least one type of waste selected from synthetic resin, synthetic rubber, and synthetic fiber.

12. The method according to claim 1, wherein, in the raw material supply step, the organic raw material and the artificial carbon particle are supplied together with organic acids to the fluidized-bed-type decomposition apparatus.

13. The method according to claim 12, wherein the organic acids are mixed with the organic raw material and the artificial carbon particle, to be supplied to the fluidized-bed-type decomposition apparatus.

14. The method according to claim 12, wherein the organic acids include a fatty acid derived from fat and oil or a salt of the fatty acid.

15. The method according to claim 1, wherein the inert gas is nitrogen.

16. The method according to claim 1, wherein the method further comprises a heat recovering step of recovering heat generated by combusting the off-gas component through heating the carrier gas before introduction into the fluidized-bed-type decomposition apparatus.

17. The method comprising the steps of the method according to claim 1, wherein the method further comprises,
a decomposed oil separation step of separating the decomposed oil generated in the gas-liquid separation step into a light cracked oil and a heavy cracked oil based on a difference in boiling point and/or a difference in solubility, and
a step of distilling reformed light cracked oil.

18. The method according to claim 1, wherein the liquid fuel is at least one type selected from naphtha, an aviation fuel, kerosine, and diesel fuel.

19. The method according to claim 18, wherein the naphtha is bio-naphtha, the aviation fuel is SAF, the kerosine is bio-kerosine, and the diesel fuel is bio-diesel fuel.

20. The method according to claim 17, wherein at least one selected from the heavy cracked oil generated in the decomposed oil separation step and the remaining oil which has not been distilled off as the liquid fuel from the distillation column in the production step of the liquid fuel is returned to the decomposition step for reprocessing.

21. The method according to claim 1, wherein 90% by mass or more of the artificial carbon particle is retained on a sieve with an opening of 0.05 mm.

* * * * *